March 9, 1937.  A. NAGEL  2,073,285
SHUTTER RELEASE FOR FOLDING CAMERAS
Filed April 9, 1936
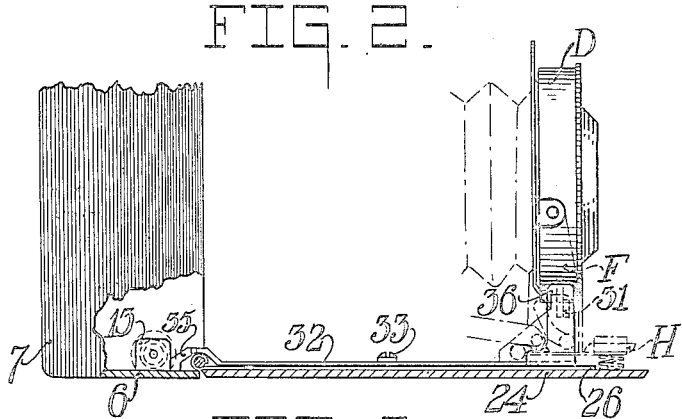
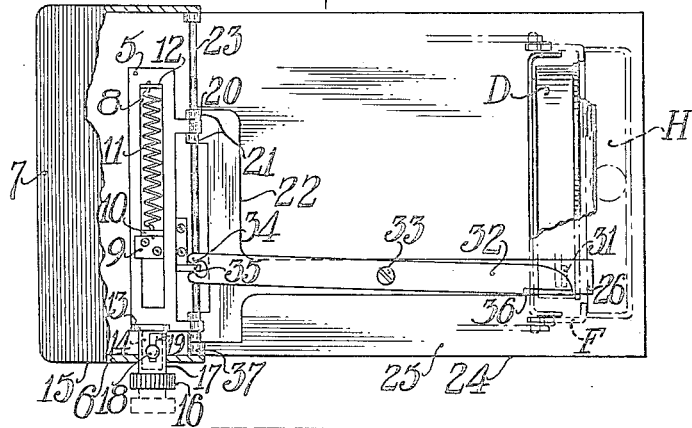
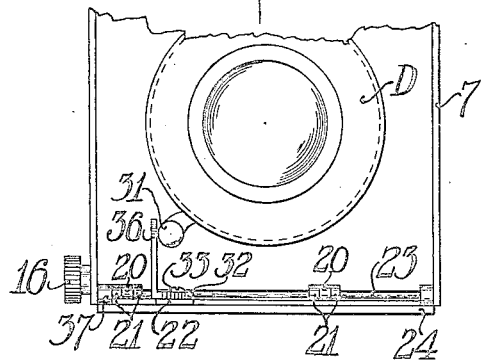
INVENTOR.
August Nagel,
BY
ATTORNEYS.

Patented Mar. 9, 1937

2,073,285

UNITED STATES PATENT OFFICE 2,073,285

SHUTTER RELEASE FOR FOLDING CAMERAS

August Nagel, Stuttgart, Germany, assignor, by mesne assignments, to Eastman Kodak Company, Jersey City, N. J., a corporation of New Jersey Application April 9, 1936, Serial No. 73,471
In Germany November 1, 1935

7 Claims. (Cl. 95—53)

This invention relates to photography and particularly to folding cameras having the shutter release mounted on the body of the camera.

One object of my invention is to provide a folding camera in which the shutter release is mounted on the body of the camera. Another object is to provide a camera in which the base board of the camera acts as a support for part of the shutter release linkage as well as serving as a door for closing the camera body. And another object is to provide a folding camera having the shutter release on the camera body, in which the axle for the base-board acts as a support on which the shutter actuating mechanism is slidably mounted. And still another object is to provide a folding camera with a shutter release mounted on the body of the camera in such a way that it is automatically brought into operating position when the camera front is extended to its picture-taking position.

Briefly, in order to attain this, the front closing part or bed of the camera serves as a base for the shutter actuating linkage. This shutter actuating linkage is in turn connected with a spring pressed sliding member which is mounted in the camera box, the axle of the bed serving as a guide on which the two are slidably mounted at their point of connection. The knob on the side of the camera housing is connected with the sliding member in the camera body so that a pressure applied axially of said knob will be translated through the entire linkage and cause an actuation of the shutter. The particular way in which the shutter release linkage on the bed is connected to the sliding member of the camera housing permits a closing of the camera without necessitating the disconnection of the several parts.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Figure 1 is a plan view of a folding camera in extended position with certain parts thereof removed to show a preferred embodiment of my shutter release.

Figure 2 is a side view of Figure 1 and,

Figure 3 is a partial front view of the camera shown in Figure 1, the lens board and erecting mechanism therefor being omitted for the purpose of clearness.

Like reference characters refer to corresponding parts in the several figures.

As illustrated in the drawing, a slide member 5 is slidably mounted on the base 6 in the camera body 7. A longitudinal slot 8 in the slide member 5 is adapted to receive a guiding member 9 which is fixed to the base 6 of the camera body 7. A bent-up portion 10 on the guiding member 9 is adapted to project through the slot 8 in the slide member 5 to act as a guide therefor along with the guiding member 9, the combination of the members 10 and 9 fixing the slide member 5 to the base 6 in such a way that it is only capable of longitudinal sliding movement.

One end of a spring 11 is fixed to the bent-up portion 10 and the guiding member 9, while the other end of the spring is fixed with the ear 12 on the sliding member 5 so that the slide member is normally spring pressed toward the inoperative position which is thus shown in Figure 1.

The end of the slide member is bent up to form an ear 13 to which a stud 14 is fixed so that it extends through the vertical wall 15 of the camera body 7 with the slide member 5 in its normal position as shown in Figure 1. A knob 16 is provided with a socket 17 which is adapted to slip over the stud 14 and be held in limited slidable engagement therewith by virtue of a sliding engagement between a pin 18 fixed to the stud 14 and the bayonet slot 19 in the socket 17.

Lugs 20 fixed to the slide member 5 are adapted to interlock with two pairs of lugs 21 on the yoke link 22, and the ends of the lugs 20 and 21 are rolled over so that the axle 23 of the bed 24 can pass therethrough and hold the parts 5 and 22 in interlocking engagement and at the same time serve as a support on which the lugs 20 and 21, respectively, are adapted to slide. The yoke link 22 is adapted to rest on the upper surface 25 of the bed 24, and its end 26 is loosely guided between the aforementioned upper surface 25 of the bed 24 and the under surface of the latch H which engages the arms F to hold the objective carrier in its erected position. The showing of the camera front erecting mechanism, here shown diagrammatically, is identical with the self-erecting front mechanism as shown in U. S. Patent 1,974,655, H. Nagel, September 25, 1934, to which reference can be had if a detailed explanation of the same is desired, but since the operation of my shutter release is not dependent upon any special form of camera front erecting mechanisms for its operation, no detailed showing or description of the same is deemed to be required in this specification.

In order that the sliding action of the slide member 5 will have a releasing effect directly upon the trigger 31 of the objective shutter D, a lever 32 is loosely pinned to the yoke link 22 by means of a screw 33. One end of the lever 32 is fork-shaped, as shown at 34, to embrace a stud 35 which is fixed to the base of a camera body 6 by being an integral part of the guide member 9. The end of the lever 32 toward the front of the bed 24 is provided with an upturned portion 36 which is in the path of the shutter trigger 31 when the foldable front is brought to its picture-taking position and it is adapted to actuate the trigger 31 on the shutter D when the shutter mechanism is operated through the knob 16. When the shutter releasing mechanism is in its normal position, slide member 5 is spring pressed toward the wall of the camera body 7 through which the knob 16 extends, and the hinge member 37 of the bed 24 acts as a stop member against which one of the lugs 21 and the slide member 5 come to rest.

The shutter releasing mechanism above described operates in the following manner. When the camera is opened, the bed 24 rotates to the position shown in Figures 1 and 2, the camera front is erected as described in the above-noted patent. Trigger 31 on the shutter D is brought into the path of lever 32 so that it can be contacted thereby. Then, in order to make an exposure, the knob 16 on the camera body 7 is pulled out to its dotted position, Figure 1, which is limited by the sliding connection between the bayonet slot 19 and the socket 17 and the pin 18 fixed to the stud portion. Knob 16 is then rotated until the pin 18 is engaged in the transverse portion of the bayonet slot 19. Then by applying a pressure axially of the knob 16 the slide member 5 is slid transversely of the camera body 7 against the action of the spring 11. As the slide member 5 moves, the yoke link 22, interconnected therewith by the interlocking of lugs 20 and 21 which slide along the axle 26, is also moved transversely of the bed 24 carrying with it lever 32 which is loosely pinned thereto. Since the lever 32 is loosely pivoted in the base of the camera body 7 at one end, as it is slid along with the yoke 22 it will pivot about the screw 33 so that the bent-up portion 36 on the end of said lever 32 will contact and trip the shutter trigger 31. By pivotally mounting lever 32 on the yoke link 22 to rotate about a fixed point 35 in the camera body 7, the displacement required in the end of the lever 32 for tripping the shutter is obtained without a great displacement in the yoke link 22. The shutter releasing mechanism is returned to its normal position by means of the spring 11.

It is obvious that the lever 32 could be omitted from the linkage by having an upturned end formed on the end 26 of the yoke member 22 so that it would contact the shutter trigger 31 as it is slid transversely on the camera bed 24 without deviating from the spirit of my invention. The only disadvantage of this set-up would be the fact that the amount of displacement required in the yoke member 22 would become excessive and slow down the operation of the linkage.

The particular way in which the movable parts 5 and 22 are connected together to slide on the axle 23 of the bed 24 and the loose connection between the end of the lever 32 with the stud 35 of the camera housing allows the camera to close without disconnecting the several connected parts of said linkage. For the carrying position, the knob 16 is adapted to be rotated until the slot 19 and the pin 14 are in position so that the knob can be pushed against the camera wall, to the position shown in Figure 1, without affecting the sliding of the slide member 5.

It is also obvious to one skilled in the art that my novel shutter could be incorporated on any folding camera in which the shutter and lens board are brought to a given position on the base board of the camera for their picture-taking positions either manually or automatically, and should in no way be limited to use with a folding camera having a self-erecting front as is shown for illustrative purposes.

Although I have shown and described certain specific embodiments of my invention, I am aware that many modifications thereof are possible. My invention, therefore, is not to be restricted except in so far as is necessitated by the prior art and the spirit of the appended claims.

Having thus described my invention what I declare as new and desire to secure by Letters Patent is:

1. In a folding camera, the combination with a camera body, of a bed hinged to said camera body and rotatably mounted thereto to swing between an open picture-taking position and a closed position, a shutter carried by said bed, a shutter release on the camera body, and suitable interconnected means having a part slidably mounted in said camera body and having a part rotatably mounted with respect to said bed and adapted to operably connect said shutter release and the shutter when said bed is rotated to a picture-taking position.

2. In a folding camera, the combination with a camera body, a bed on said camera body and movable to an open picture taking position and to a closed position, and a shutter carried by said bed, of a shutter release on said camera body, a member slidably mounted on said camera body for operation by said shutter release, a second member mounted for rotation with respect to said bed and for actuating said shutter, and a connection between said members when said bed is moved to said open picture taking position and permitting relative movement of said members upon movement of said bed to closed position.

3. In a folding camera, the combination with a camera body, a bed on said camera body, a lens board and a shutter foldably mounted on said bed, a trigger on said shutter, of a shutter release on said camera body, and a linkage operably connecting said shutter release with said shutter when the lens board and shutter are brought to picture-taking position, said linkage including a bar member slidably mounted on the base of said camera body, and a system of levers on said bed connected with said bar member and adapted to slide therewith, said system of levers extending longitudinally of the bed so that the end thereof is in the path of the shutter.

4. In a folding camera, the combination with a camera body, a bed hinged to said body, a lens board and a shutter foldably mounted on said bed, a trigger on said shutter, of a shutter release on said camera body, and a linkage operably connecting said shutter release with said shutter when the lens board and shutter are brought into picture-taking position, said linkage including a bar member slidably mounted on the base of said camera body, and a system of levers slidably mounted on said camera bed and adapted to extend longitudinally thereof so that one end is in the path of the shutter trigger, and the other end of said system of levers connected with said bar member in such a way that a rotation of the bed upon its hinge does not break the connection between the two.

5. In a folding camera, the combination of the camera body, a bed hinged to camera body, a lens board and shutter foldably mounted on said bed, a trigger on said shutter, of a shutter release on said camera body, and a linkage operably connecting said shutter release and said shutter trigger when the lens board and shutter are brought to a picture-taking position, said linkage including a bar member slidably mounted on the base of the camera body, a yoke member slidably mounted on said camera bed and connected with said bar member, an elongated lever pivoted intermediate the ends of said yoke member, one end of said lever loosely pivoted to said camera body while the other end extends into the path of the shutter trigger.

6. In a folding camera, the combination with a camera body, an axle on the base of said camera body, a bed rotatably hinged on said axle, a lens board and shutter foldably mounted on the forward end of said bed, a trigger on said shutter, of a shutter release on said camera body, and a suitable linkage operably connecting said shutter release with said shutter when the camera parts are brought to their picture-taking positions, said linkage including a spring pressed bar member mounted on the base of said camera body and on said axle to slide transversely of the camera body when axial pressure is applied to the shutter release, a yoke member on said bed and extending longitudinally thereof, one end of said link mounted on said axle to be slidable there-along with said bar member, while the other end of said linkage is loosely confined on the forward end of the bed, and a lever pivoted to said yoke link to move therewith, one end of said lever being loosely pivoted on the base of the camera body while the other end extends into the path of the shutter trigger when said shutter is in its picture-taking position.

7. In a folding camera, the combination with a camera body, an axle on said camera body, a bed rotatably mounted on said axle, a lens board and shutter foldably mounted on the forward end of said bed, a trigger on said shutter, of a yoke link on said bed extending longitudinally thereof, one end of said link being rotatably and slidably mounted on said axle while the other end of said link is confined to slide on said bed, a lever pivotally mounted on said yoke link and having one end loosely pivoted to said camera base while the other end is adapted to extend into the path of said shutter trigger when said shutter is brought into its picture-taking position, a bar member slidably mounted on the base of said camera body, lugs on said bar member slidable along said axle and interconnected with said yoke link thereon, and a shutter release mounted on said camera body and connected with said bar member so that a pressure on said shutter release and axially thereof will effect an actuation of said shutter trigger.

AUGUST NAGEL.